(12) United States Patent
Ichikawa (10) Patent No.: US 10,447,893 B2
(45) Date of Patent: Oct. 15, 2019

(54) IMAGE FORMING APPARATUS, COMPUTER-READABLE STORAGE MEDIUM, AND IMAGE FORMING METHOD WITH POSITION ACQUISITION AND CORRECTION

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Masaki Ichikawa, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/902,466

(22) Filed: Feb. 22, 2018

(65) Prior Publication Data
US 2019/0260907 A1  Aug. 22, 2019

(51) Int. Cl.
G06F 3/08 (2006.01)
H04N 1/60 (2006.01)
H04N 1/387 (2006.01)
H04N 1/00 (2006.01)
H04N 1/64 (2006.01)

(52) U.S. Cl.
CPC ....... H04N 1/6008 (2013.01); H04N 1/00045 (2013.01); H04N 1/3878 (2013.01); H04N 1/64 (2013.01)

(58) Field of Classification Search
CPC ............ H04N 1/6008; H04N 1/00045; H04N 1/3838; H04N 1/64
USPC .................................... 358/518, 1.9
See application file for complete search history.

(56) References Cited

U.S. PATENT DOCUMENTS

| 8,718,519 B2 | 5/2014 | Nakashima | |
| 2008/0170892 A1* | 7/2008 | Park | H04N 1/00002 399/301 |
| 2013/0076818 A1* | 3/2013 | Takebayashi | B41J 2/155 347/12 |

FOREIGN PATENT DOCUMENTS

JP  2013-057936 A  3/2013

\* cited by examiner

*Primary Examiner* — Douglas Q Tran
(74) *Attorney, Agent, or Firm* — Foley & Lardner LLP (57) ABSTRACT

An image forming apparatus includes a printer, a sensor, and a processor. The printer forms an image with image forming material of colors on a medium. The sensor detects the image forming material of each color on the medium. The processor forms a pattern with the image forming material of the colors on the medium using the printer, acquires a position of a pattern of each color using the sensor, and after executing correction for bringing positions where images of the other colors are formed close to a position where an image of a reference color is formed based on the position of each pattern, corrects a position where either an image of a first color or an image of a second color is formed by the printer based on a distance between patterns of the first color and second color furthest away from each other.

19 Claims, 5 Drawing Sheets

IMAGE FORMING APPARATUS, COMPUTER-READABLE STORAGE MEDIUM, AND IMAGE FORMING METHOD WITH POSITION ACQUISITION AND CORRECTION

FIELD

Embodiments described herein relate generally to an image forming apparatus, a computer-readable storage medium and an image forming method.

BACKGROUND

An image forming apparatus forms images using toner of a plurality of colors. Such an image forming apparatus corrects positions where images of other colors are formed by using a position where an image of a predetermined reference color is formed as a reference in some cases.

There is a problem that a color shift is not corrected sufficiently in the image forming apparatus due to a lack of consideration of a position of a color other than the reference color.

DETAILED DESCRIPTION

In accordance with an embodiment, an image forming apparatus comprises a printer, a sensor, and a processor. The printer forms an image with image forming material of a plurality of colors on a medium. The sensor detects the image forming material of each color on the medium. The processor forms a pattern with the image forming material of the plurality of colors on the medium using the printer, acquires a position of a pattern of each color using the sensor, and after executing correction for bringing positions where images of the other colors are formed close to a position where an image of a reference color is formed by the printer based on the position of each pattern, corrects a position where either an image of a first color or an image of a second color is formed by the printer based on a distance between patterns of the first color and second color furthest away from each other.

Hereinafter, an embodiment is described with reference to the accompanying drawings.

An image forming apparatus according to an embodiment performs a color printing on a predetermined image according to an operation from a user. The image forming apparatus prints an image using image forming material of three or more colors, according to an embodiment. The image forming apparatus corrects displacement (i.e., a color shift) in a position where an image of each color is formed. The image forming apparatus corrects the color shift so that images of respective colors are formed at the same position. The image forming apparatus forms an image using toner as the image forming material, according to at least one embodiment.

Figure 1:
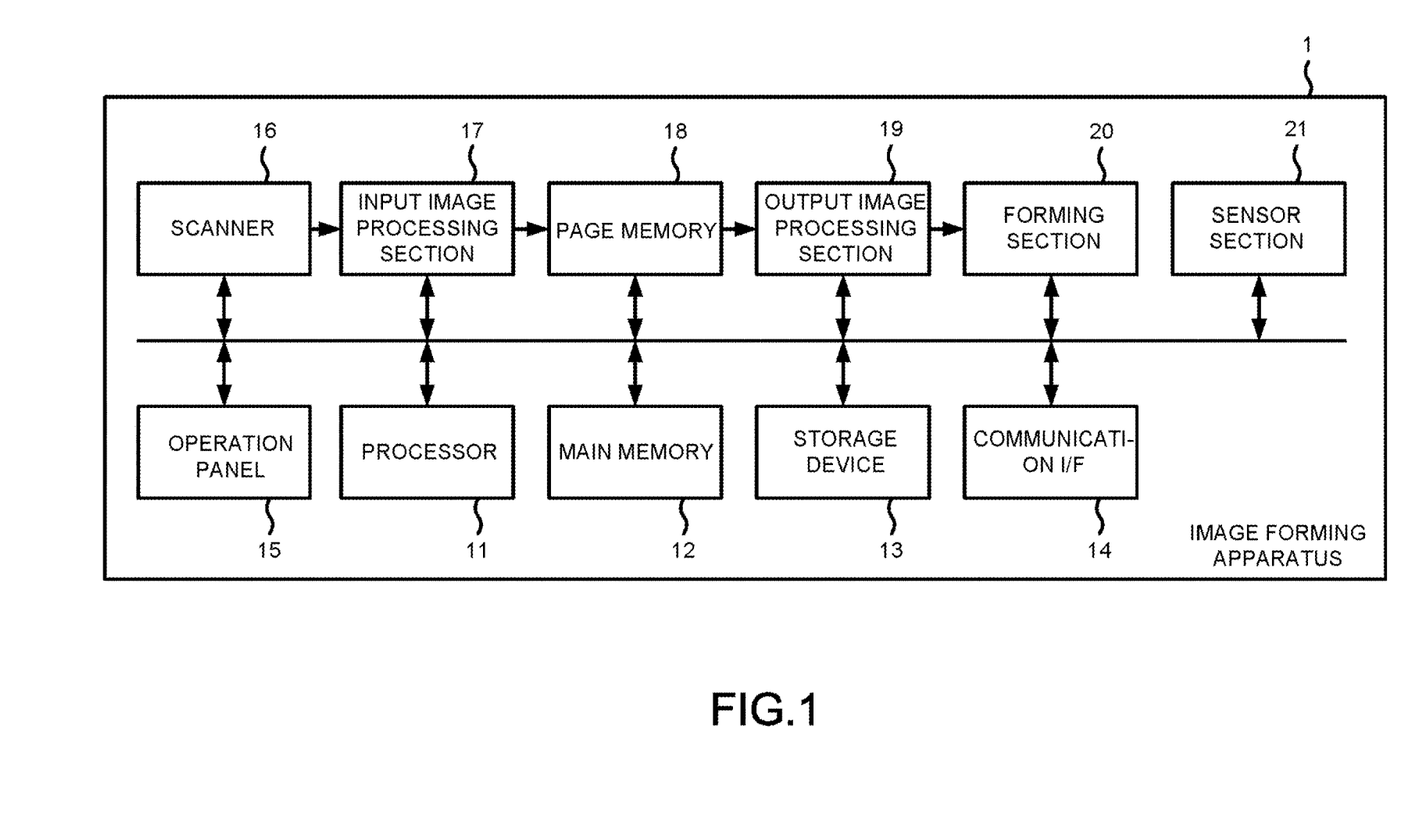
FIG. 1 is a block diagram exemplifying an arrangement of an image forming apparatus according to an embodiment.

FIG. 1 is a block diagram exemplifying an arrangement of an image forming apparatus 1 according to an embodiment.

As shown in FIG. 1, the image forming apparatus 1 includes a processor 11, a main memory 12, a storage device 13, a communication interface 14, an operation panel 15, a scanner 16, an input image processing section 17, a page memory 18, an output image processing section 19, a forming section 20 and a sensor section 21. These sections are connected to each other via a data bus line or the like. The image forming apparatus 1 may have a component as necessary besides the components shown in FIG. 1, or a specific component may be excluded from the image forming apparatus 1.

The processor 11 has a function of controlling the operation of the whole image forming apparatus 1. The processor 11 may include an internal memory and various interfaces. The processor 11 executes various processing by executing a program stored in the internal memory or the storage device 13 in advance.

A part of various functions realized by executing the program by the processor 11 may be realized by a hardware circuit. In this case, the processor 11 controls functions realized by the hardware circuit.

The main memory 12 is a volatile memory. The main memory 12 is a working memory or a buffer memory. The main memory 12 stores various application programs based on a command from the processor 11. The main memory 12 may store data necessary for executing the application program, execution results of the application program and the like.

The storage device 13 (computer-readable storage medium) is a nonvolatile memory capable of writing and rewriting data. The storage device 13 is, for example, a HDD (Hard Disk Drive), a SSD (Solid State Drive), an EEPROM (Registered Trademark) or a flash memory. The storage device 13 stores a control program, an application, various data, and the like according to the purpose of the image forming apparatus 1.

Various instructions are input to the operation panel 15 by the operator of the image forming apparatus 1. The operation panel 15 transmits data of an instruction input by the operator to the processor 11. The operation panel 15 includes, for example, a keyboard, a numeric keypad, a touch panel, and the like as operation sections.

The operation panel 15 displays various information to the operator of the image forming apparatus 1. The operation panel 15 displays a screen showing various information based on a signal from the processor 11. The operation panel 15 includes, for example, a liquid crystal display as a display section.

The scanner 16 optically scans an original document and reads an image on the original document as image data. The scanner 16 reads the original document as a color image. The scanner 16 is composed of a sensor row formed in a main scanning direction. The scanner 16 moves the sensor row in a sub-scanning direction and reads the whole original document.

The input image processing section 17 processes the image data read by the scanner 16. The input image processing section 17 may process image data from a device other than the scanner 16. For example, the input image processing section 17 may process image data sent from a USB memory, a PC, a smartphone, or the like.

The page memory 18 stores the image data processed by the input image processing section 17.

The output image processing section 19 processes the image data stored in the page memory 18 in such a manner that the forming section 20 can print the image data on a paper.

The forming section 20 (printer) prints the image data processed by the output image processing section 19 on a paper based on an instruction of the processor 11.

The forming section 20 prints the image data on a paper with an electrophotographic system, for example. The forming section 20 includes a transfer body, rollers for driving the transfer body and image forming sections for forming an image on the transfer body. The forming section is described later.

The sensor section 21 detects the toner formed on the transfer body of the forming section. The sensor section 21 detects the toner on the transfer body. The sensor section 21 is composed of, for example, a CCD (Charge Coupled Device) camera or the like.

Figure 2:
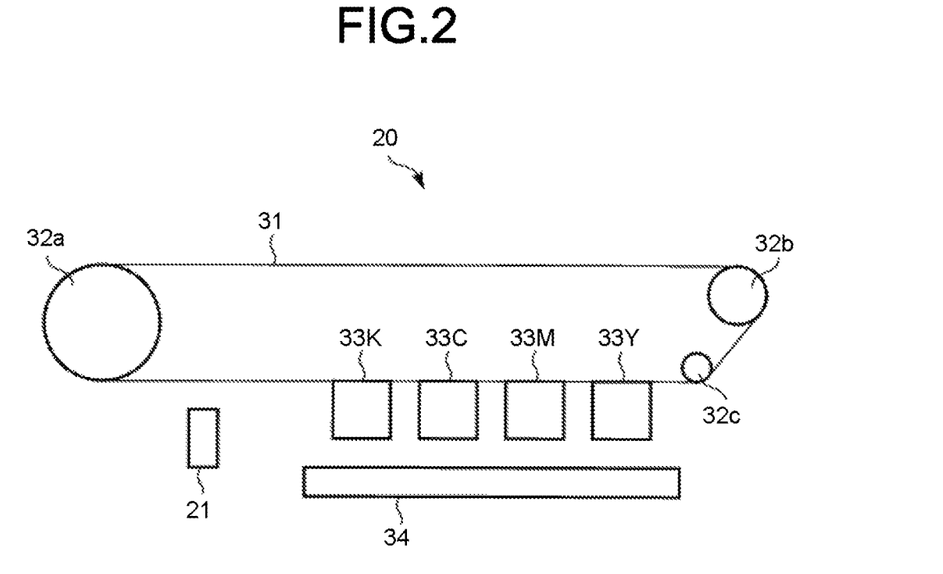
FIG. 2 is a diagram exemplifying an arrangement of a forming section according to an embodiment.

Next, the forming section 20 is described.

FIG. 2 is a diagram exemplifying an arrangement of the forming section 20. As shown in FIG. 2, the forming section 20 includes a transfer body 31, rollers 32, image forming sections 33 and an exposure section 34.

The transfer body 31 (medium) is an intermediate transfer body of the toner formed on the paper. The transfer body 31 is formed into a belt shape. The transfer body 31 has a predetermined width and is formed into an annular shape.

The rollers 32 are used for driving the transfer body 31. The rollers 32 include rollers 32a to 32c. Each of the rollers 32a to 32c is formed inside the transfer body 31. Each of the rollers 32a to 32c pulls the transfer body 31 from the inside with a predetermined tension to form a flat surface shape.

Each of the rollers 32a to 32c rotates by a driving force from a driving section. Each of the rollers 32a to 32c rotates to drive the transfer body 31. Some of the rollers 32a and 32c may passively rotate.

The image forming sections 33 (33Y, 33M, 33C and 33K) form an image to be transferred onto a paper. In the exemplary arrangement shown in FIG. 2, an image forming section 33Y forms an image with yellow toner. An image forming section 33M forms an image with magenta toner. An image forming section 33C forms an image with cyan toner. An image forming section 33K forms an image with black toner. Each of the image forming sections 33 (33Y, 33M, 33C and 33K) superimposes the image of each color on the transfer body 31 to transfer the image of each color. As a result, the color image is formed on the transfer body 31.

The exposure section 34 forms an electrostatic latent image on a photoconductive drum (image carrier) of each of the image forming sections 33 (33Y, 33M, 33C and 33K) with laser light. The exposure section 34 irradiates the photoconductive drum with the laser light controlled according to the image data via an optical system such as a polygon mirror. The laser light from the exposure section 34 forms an electrostatic latent image on the surface of each photoconductive drum. The exposure section 34 controls the laser light according to a control signal from the processor 11. The electrostatic latent image formed on each photoconductive drum is an image developed with the toner of each color. For example, the exposure section 34 controls the power of the laser light in response to a control signal from the processor 11. The exposure section 34 further controls a modulation amount of a pulse width for controlling the emission of the laser light according to the control signal from the processor 11.

Each of the image forming sections 33 (33Y, 33M, 33C and 33K) has the photoconductive drum, respectively. Each of the image forming sections 33 (33Y, 33M, 33C and 33K) develops the electrostatic latent image formed on each photoconductive drum with the toner of each color. Each of the image forming sections 33 (33Y, 33M, 33C and 33K) forms the toner image as a visible image on the photoconductive drum. Each of the image forming sections 33 (33Y, 33M, 33C and 33K) transfers (i.e., performs a primary transfer) the toner image formed on the photoconductive drum onto the transfer body 31. Each of the image forming sections 33 (33Y, 33M, 33C and 33K) applies a transfer bias to the toner image at a primary transfer position. Each of the image forming sections 33 (33Y, 33M, 33C and 33K) controls the transfer bias with a transfer current. The toner image on each photoconductive drum is transferred onto the transfer body 31 by the transfer bias at each primary transfer position. For example, the processor 11 controls the transfer current each image forming section uses for a primary transfer processing.

The sensor section 21 is formed at the downstream side of each of the image forming sections 33 (33Y, 33M, 33C and 33K). Here, the downstream side indicates the downstream side in a direction in which the transfer body 31 is driven. The sensor section 21 detects each toner image formed by each of the image forming sections 33 (33Y, 33M, 33C and 33K).

The forming section 20 transfers (i.e., performs a secondary transfer) the toner image formed on the transfer body 31 onto the paper. The forming section 20 heats the paper onto which the toner image is transferred by a heating section to fix the toner image on the paper.

Next, the function realized by the image forming apparatus 1 is described. The function realized by the image forming apparatus 1 is realized by executing the programs stored in the storage device 13 by the processor 11.

First, the processor 11 has a function of correcting the positions where toner images of the other colors are formed based on a position where the toner image of a reference color (for example, black) is formed.

The processor 11 corrects the color shift by bringing the positions where the toner images of the other colors are formed close to the position where the toner image of the reference color is formed.

The processor 11 forms a pattern of a predetermined shape on the transfer body 31 using each of the image forming sections 33. The processor 11 forms patterns of respective colors on the transfer body 31 at predetermined intervals.

Figure 3:
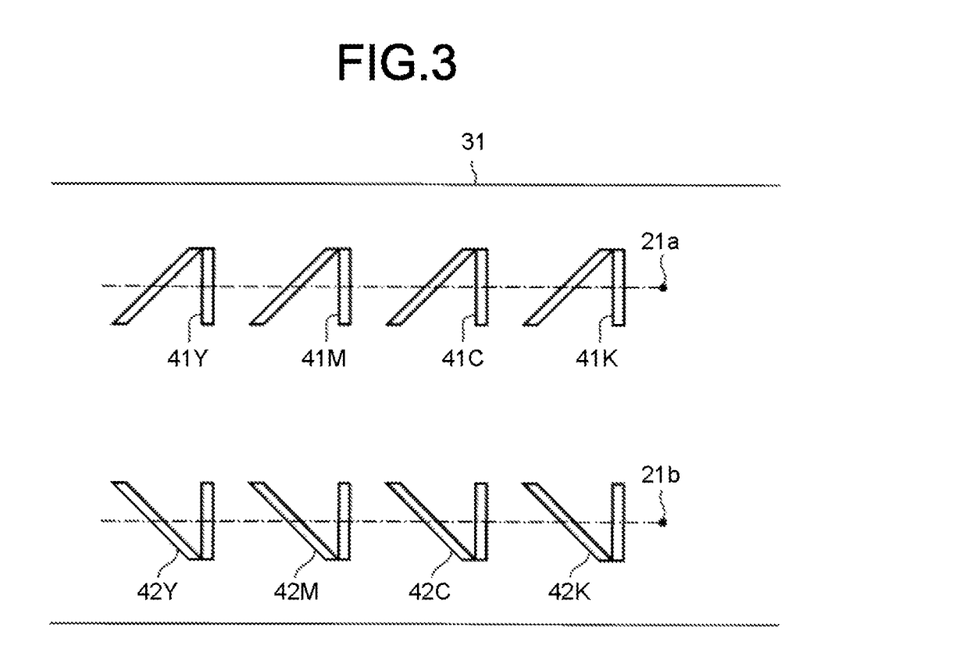
FIG. 3 is a diagram illustrating an example of a pattern formed on a transfer body according to an embodiment.

FIG. 3 shows an example of the pattern formed on the transfer body 31. As shown in FIG. 3, the processor 11 forms a pattern 41 and a pattern 42 on the transfer body 31.

The pattern 41 is formed in a predetermined region of the transfer body 31. In the example shown in FIG. 3, the pattern 41 is formed at a position close to one side in the main scanning direction. The pattern 41 is composed of patterns 41K, 41C, 41M and 41Y. The pattern 41K is formed by using the black toner. The pattern 41K is formed by the image forming section 33K.

The pattern 41C is formed by using the cyan toner. The pattern 41C is formed by the image forming section 33C.

The pattern 41M is formed by using the magenta toner. The pattern 41M is formed by the image forming section 33M.

The pattern 41Y is formed by using the yellow toner. The pattern 41K is formed by the image forming section 33Y.

The pattern 42 is formed at a position facing the pattern 41 in the main scanning direction. The pattern 42 is composed of patterns 42K, 42C, 42M and 42Y. The patterns 42K, 42C, 42M, and 42Y are formed by using the black toner, the cyan toner, the magenta toner and the yellow toner, respectively.

The shape and position of the pattern are not limited to specific configurations described herein.

If a pattern is formed on the transfer body 31, the processor 11 acquires the position of each pattern using the sensor section 21. For example, the processor 11 drives the transfer body 31 so that the pattern passes over the sensor section 21. The processor 11 acquires the position of each pattern based on a timing at which the sensor section 21 detects the toner.

In the example shown in FIG. 3, the sensor section 21 detects the toner at points 21a and 21b. The processor 11 receives a signal from the sensor section 21 indicating that the toner is detected at the points 21a and 21b. For example, the processor 11 acquires the position of each pattern based on, for example, the timing of reception of the signal indicating that the toner is detected at the points 21a and 21b.

If the position of each pattern is acquired, the processor 11 corrects the color shift by using the position of the pattern of the reference color as the reference. For example, the processor 11 calculates a deviation between the position where the toner image of the reference color is formed and the positions where the toner images of the other colors are formed, based on the position of each pattern. For example, the processor 11 calculates the deviation based on a difference between a position where each pattern is to be formed and a position of an actual pattern acquired by using the sensor section 21.

If the deviation is calculated, the processor 11 corrects the positions where the other colors are formed in units of dots in such a manner that the deviation of the reference color is coincident with the deviation of the other colors. The processor 11 adjusts the positions where the toner images of the other colors are formed in such a manner that a difference between the position where the toner image of the reference color is formed and the positions where the toner images of the other colors are formed is 1 dot or less.

Here, the reference color is black. In other words, the processor 11 adjusts the positions where the toner images of the other colors are formed in units of dots by using the position where the black toner image is formed as the reference.

The processor 11 similarly corrects the color shift in the main scanning direction and the sub-scanning direction.

The processor 11 has a function of correcting the color shift based on the positions of the toner images of the two colors farthest away from each other.

After performing the color shift correction based on the position of the toner image of the reference color, the processor 11 calculates a relative position between the position of the toner image of the reference color and the positions of the toner images of the other colors. For example, the processor 11 acquires the position of the toner image of a color other than the reference color in dot notation. As the relative position, the processor 11 acquires a value at the first decimal place of the dot notation. Here, it is assumed that the value at the first decimal place of the dot notation indicating the position of the toner image of the reference color is 0.

Figure 4:
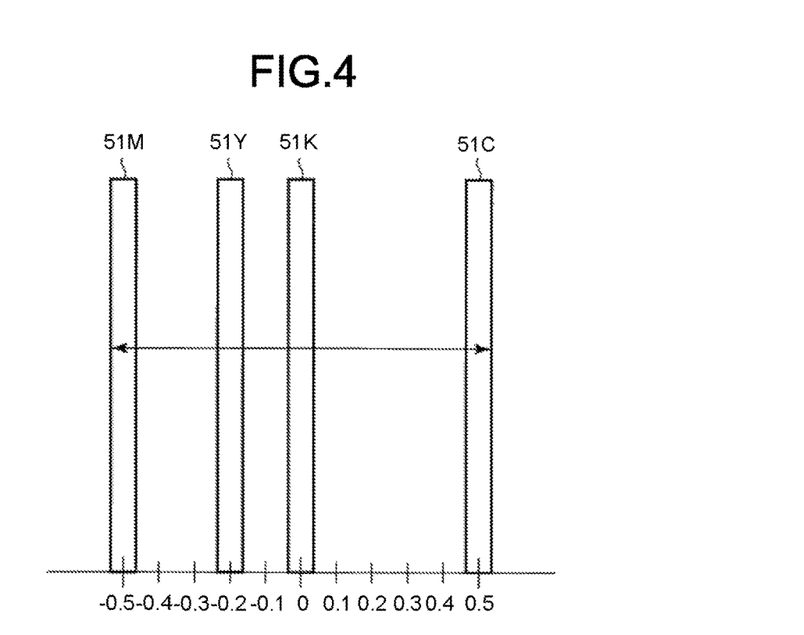
FIG. 4 is a diagram illustrating a position of a toner image of each color formed by the forming section according to an embodiment.

FIG. 4 shows the relative position between the positions of respective toner images. In the example shown in FIG. 4, the reference color is black. In FIG. 4, a horizontal axis indicates relative positions with dots. FIG. 4 shows a bar 51K, a bar 51C, a bar 51M and a bar 51Y.

The bars 51K, 51C, 51M and 51Y indicate positions where the toner images of black, cyan, magenta and yellow are formed, respectively. Here, since the reference color is black, the bar 51K indicates "0".

The bar 51M indicates "−0.5". The bar 51M indicates that the magenta toner image is shifted by −0.5 dots from the black toner image.

The bar 51Y indicates "−0.2". The bar 51Y indicates that the yellow toner image is shifted by −0.2 dots from the black toner image.

The bar 51C indicates "0.5". The bar 51C indicates that the cyan toner image is shifted by 0.5 dots from the black toner image.

If the relative position between the positions of the toner images of respective colors is calculated, the processor 11 calculates the distance (P-P distance) of the farthest two colors (the first color and the second color). For example, the processor 11 calculates the distance between respective toner images. In other words, the processor 11 calculates distances among the bars 51K, 51C, 51M and 51Y. If the distance between respective toner images is calculated, the processor 11 determines the farthest two colors.

If the farthest two colors are determined, the processor 11 determines whether the P-P distance exceeds a threshold value. The threshold value may be a predetermined value or a value based on a positional relationship of the other toner images. The threshold value is a value when the distance between the farthest two colors is reduced if the position of the toner image is corrected as follows.

If it is determined that the P-P distance exceeds the threshold value, the processor 11 corrects the position of the color, which is farther from the position of the toner image of the reference color between the toner images of the two colors having P-P distance therebetween, by 1 dot in the direction of the position of the other color.

The processor 11 may select a color to be corrected based on the position where the toner image of each color is formed so that the P-P distance becomes short.

Figure 5:
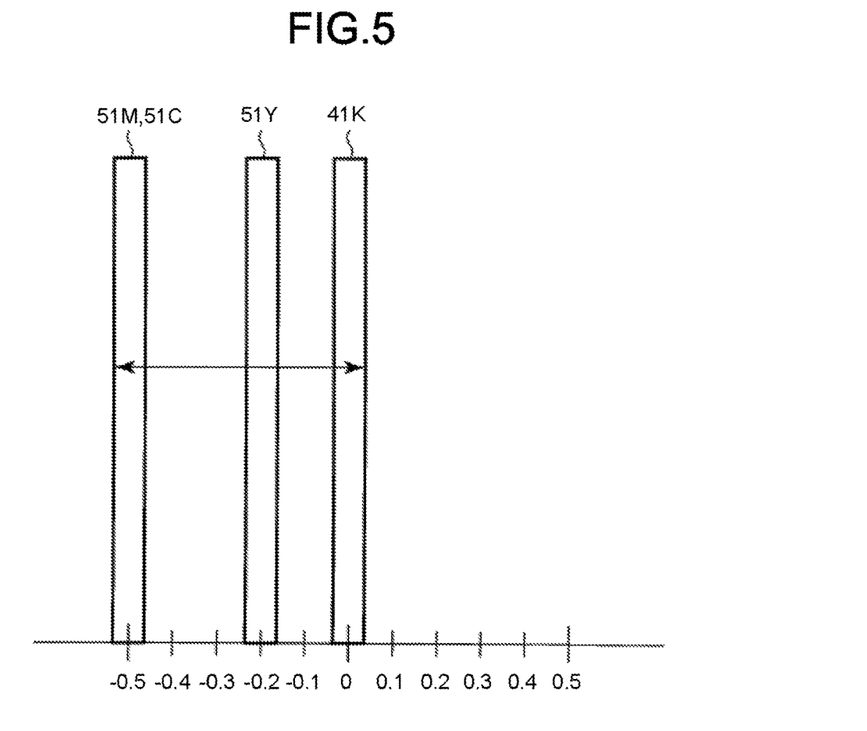
FIG. 5 is a diagram illustrating the position of the toner image of each color formed by the forming section according to an embodiment.

FIG. 5 shows the position of each toner image after correction.

In FIG. 4, the processor 11 determines that the farthest two colors are magenta and cyan. The processor 11 calculates that the distance between the position of the magenta toner image and the position of the cyan toner image is 1 dot. Here, the processor 11 determines that the distance is higher than the threshold value.

The distance between the position of the magenta toner image and the position of the black (reference color) toner image is the same as the distance between the position of the cyan toner image and the position of the black (reference color) toner image. Therefore, the processor 11 may correct the position where either the magenta toner image or the cyan toner image is formed. Here, the processor 11 corrects the position where the cyan toner image is formed.

The processor 11 corrects the position where the cyan toner image is formed by 1 dot in the direction of the position of the magenta toner image. In other words, the processor 11 corrects the position of the cyan toner image by −1 dot. As shown in FIG. 5, after the correction, the position of the cyan toner image (bar 51C) overlaps with the position of the magenta toner image (bar 51M). As a result, as shown in FIG. 5, the P-P distance is 0.5 dots.

The processor 11 similarly corrects the color shift in the main scanning direction and the sub-scanning direction.

Figure 6:
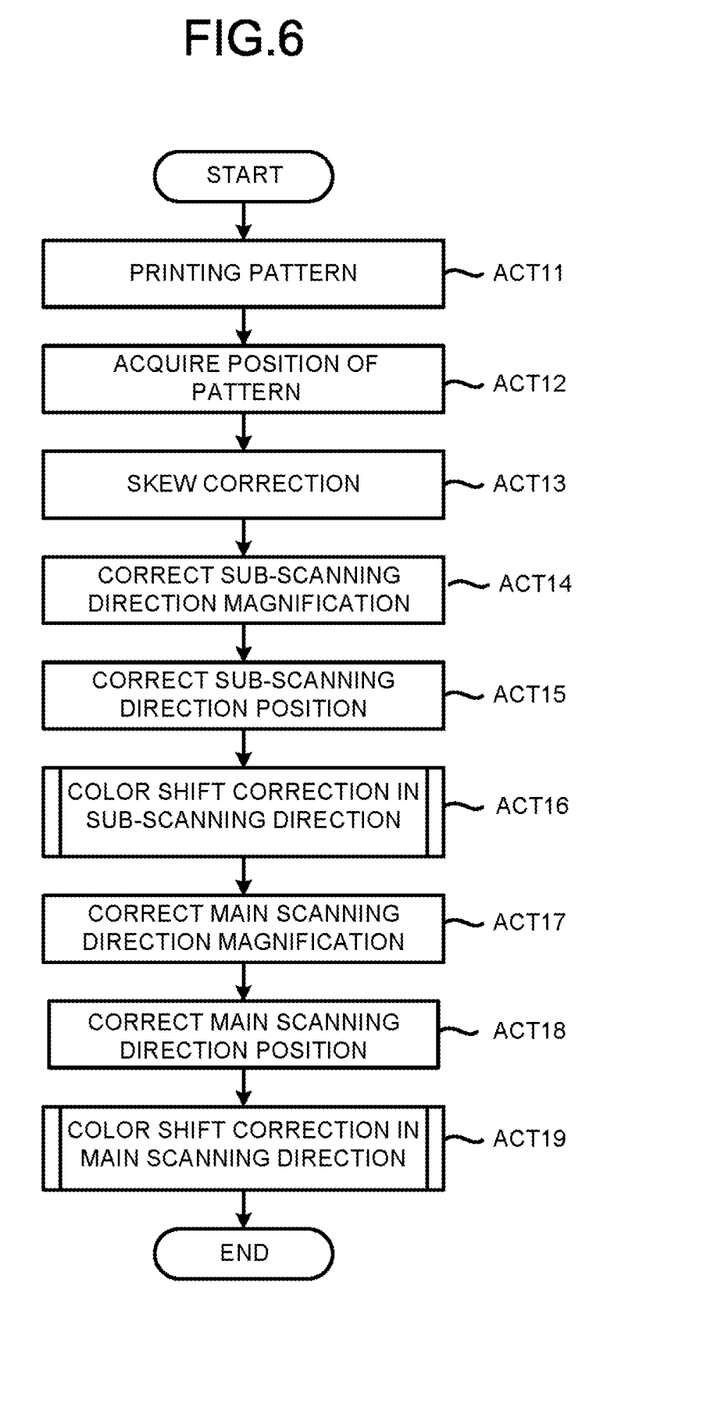
FIG. 6 is a flowchart exemplifying the operation of the image forming apparatus according to an embodiment.

Next, an operation example of the image forming apparatus 1 is described. FIG. 6 is a flowchart for exemplifying the operation of the image forming apparatus 1. Here, an operation example in which various corrections performed by the image forming apparatus 1 before printing is described. For example, the image forming apparatus 1 performs the following operations at the time of startup. The image forming apparatus 1 may perform the following operations in a predetermined case (for example, when a change amount of temperature exceeds a predetermined threshold value).

First, the processor 11 of the image forming apparatus 1 prints the pattern of each color on the transfer body 31 by using the image forming section 33 (ACT 11). If the pattern of each color is printed, the processor 11 acquires the position of the pattern of each color with the sensor section 21 (ACT 12).

If the position of the pattern of each color is acquired, the processor 11 performs skew correction based on the position of each pattern (ACT 13). If the skew correction is performed, the processor 11 corrects a magnification in the sub-scanning direction (ACT 14). If the magnification in the sub-scanning direction of the toner image is corrected, the processor 11 corrects the position in the sub-scanning direction where the toner image is formed (ACT 15).

If the position in the sub-scanning direction is corrected, the processor 11 corrects the color shift for the sub-scanning direction (ACT 16). If the color shift in the sub-scanning direction is corrected, the processor 11 corrects the magnification in the main scanning direction (ACT 17). If the magnification in the main scanning direction of the toner image is corrected, the processor 11 corrects the position in the main scanning direction where the toner image is formed (ACT 18).

If the position in the main scanning direction is corrected, the processor 11 corrects the color shift in the main scanning direction (ACT 19). If the color shift in the main scanning direction is corrected, the processor 11 ends the operation.

Figure 7:
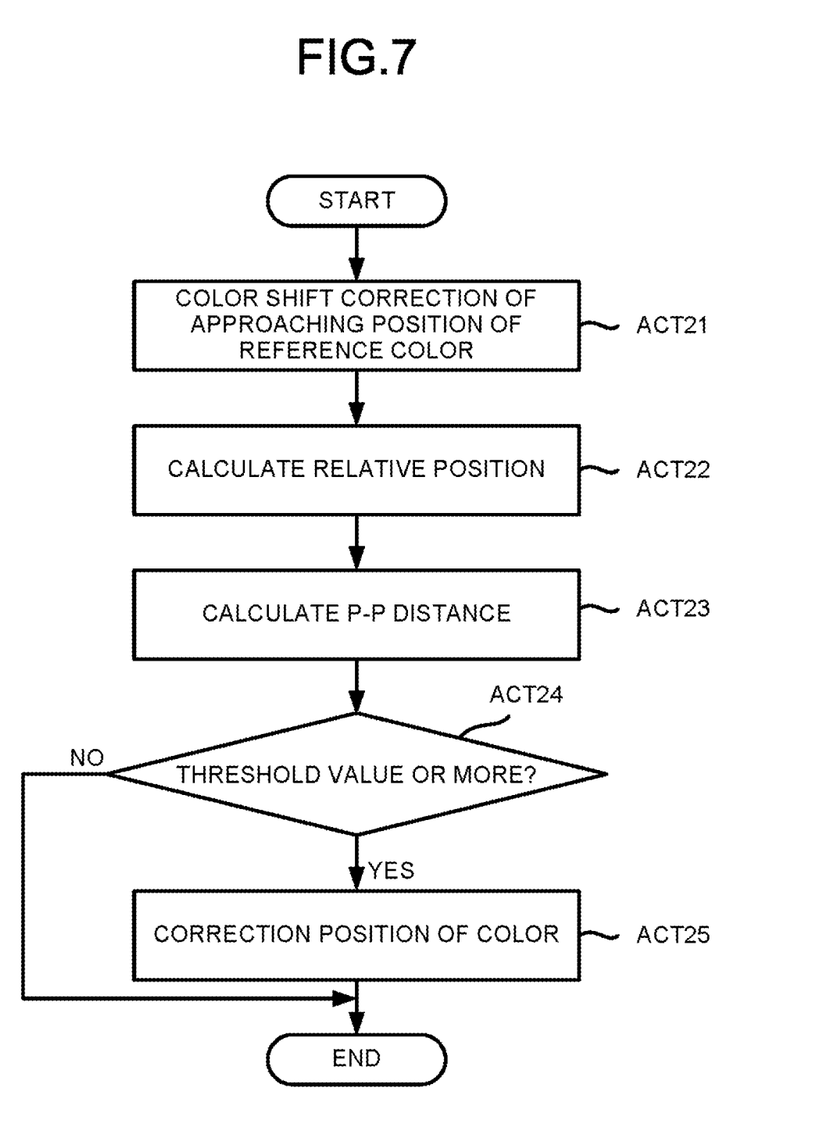
FIG. 7 is a flowchart exemplifying the operation of the image forming apparatus according to an embodiment.

Next, an operation example (ACT 16 and ACT 19) in which the image forming apparatus 1 performs the color shift correction is described. FIG. 7 is a flowchart for explaining an operation example in which the image forming apparatus 1 performs the color shift correction. As the same operation is executed in ACT 16 and ACT 19 except that the directions of the color shift correction are different, the operation thereof is collectively described.

First, the processor 11 of the image forming apparatus 1 performs the correction of bringing the positions of the toner images of the other colors close to the position of the toner image of the reference color (ACT 21). If the correction of bringing the positions of the toner images of the other colors close to the position of the toner image of the reference color is performed, the processor 11 calculates the relative position between positions where the toner images of respective colors are formed (ACT 22).

If the relative position is calculated, the processor 11 calculates the P-P distance (ACT 23). If the P-P distance is calculated, the processor 11 determines whether the P-P distance is equal to or greater than the threshold value (ACT 24).

If it is determined that the P-P distance is equal to or greater than the threshold value, the processor 11 corrects the position of the color, which is farther from the reference color between the two colors having the P-P distance, by 1 dot in the direction of the position of the other color (ACT 25).

If it is determined that the P-P distance is not equal to or greater than the threshold value (No in ACT 24), or if the position of the color farther from the reference color is corrected by 1 dot (ACT 25), the processor 11 terminates the operation.

The processor 11 may execute the processing in ACT 14 to ACT 16 after executing the processing in ACT 17 to ACT 19. The processor 11 may not execute the processing in ACT 13 to ACT 15, ACT 17 and ACT 18.

Further, the image forming apparatus 1 may form an image by an inkjet system. For example, the forming section 20 may form images by discharging ink of a plurality of colors to the paper. For example, the processor 11 may form a pattern of each color on a paper, acquire the position of each pattern, and correct the color shift.

The image forming apparatus described above corrects the color shift based on the P-P distance after the correction for matching the positions of the toner images of the other colors with the position of the toner image of the reference color. The image forming apparatus performs the correction of bringing one of the furthest two colors approach to the other by 1 dot. As a result, the image forming apparatus can align the positions where the toner images of respective colors are formed. Therefore, the image forming apparatus can correct the color shift more effectively.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:
1. An image forming apparatus, comprising:
   a printer configured to form an image with image forming material of a plurality of colors on a medium;
   a sensor configured to detect the image forming material of each of the plurality of colors on the medium; and
   a processor configured to
      cause a printer to form a pattern with the image forming material of the plurality of colors on the medium,
      acquire a position of a pattern of each of the plurality of colors using the sensor, and
      after executing correction for bringing positions where images of other colors are formed close to a position where an image of a reference color is formed by the printer based on the position of each pattern, correct a position where either an image of a first color or an image of a second color is formed by the printer based on a distance between patterns of the first color and second color furthest away from each other.
2. The image forming apparatus according to claim 1, wherein
   the processor is configured to correct a position where either the image of the first color or the image of the second color is formed based on positions where the printer forms the images of respective colors.

3. The image forming apparatus according to claim 1, wherein
the processor is configured to correct the position where either the image of the first color or the image of the second color is formed when a distance between a pattern of the first color and a pattern of the second color is equal to or greater than a threshold value.

4. The image forming apparatus according to claim 2, wherein
the processor is configured to correct the position where either the image of the first color or the image of the second color is formed when a distance between a pattern of the first color and a pattern of the second color is equal to or greater than a threshold value.

5. The image forming apparatus according to claim 1, wherein
the image forming material is toner.

6. The image forming apparatus according to claim 1, wherein
the processor is configured to correct the position where the printer forms an image in units of dots.

7. A non-transitory computer-readable storage medium configured to store therein a program executable by a processor to cause the processor to
cause a printer to form a pattern with image forming material of a plurality of colors on a medium;
acquire a position of a pattern of each of the plurality of colors using a sensor; and
after executing correction for bringing positions where images of other colors are formed close to a position where an image of a reference color is formed by the printer based on the position of each pattern, correct a position where either an image of a first color or an image of a second color is formed by the printer based on a distance between patterns of the first color and second color furthest away from each other.

8. The non-transitory computer-readable storage medium according to claim 7, wherein
the processor is configured to correct a position where either the image of the first color or the image of the second color is formed based on positions where the printer forms the images of respective colors.

9. The non-transitory computer-readable storage medium according to claim 7, wherein
the processor is configured to correct the position where either the image of the first color or the image of the second color is formed when a distance between a pattern of the first color and a pattern of the second color is equal to or greater than a threshold value.

10. The non-transitory computer-readable storage medium according to claim 8, wherein
the processor is configured to correct the position where either the image of the first color or the image of the second color is formed when a distance between a pattern of the first color and a pattern of the second color is equal to or greater than a threshold value.

11. The non-transitory computer-readable storage medium according to claim 7, wherein
the processor is configured to determine a deviation between a distance where a first pattern is to be formed and a position of another pattern acquired by the sensor.

12. The non-transitory computer-readable storage medium according to claim 7, wherein
the processor is configured to correct the position where the printer forms an image in units of dots.

13. An image forming method executed by a processor of an image forming apparatus, comprising:
forming a pattern with image forming material of a plurality of colors on a medium using a printer;
acquiring, by a sensor, a position of a pattern of each of the plurality of colors; and
after executing correction for bringing positions where images of other colors are formed close to a position where an image of a reference color is formed by the printer based on the position of each pattern, correcting a position where either an image of a first color or an image of a second color is formed by the printer based on a distance between patterns of the first color and second color furthest away from each other.

14. The image forming method according to claim 13, further comprising:
correcting, by the processor, a position where either the image of the first color or the image of the second color is formed based on positions where the printer forms the images of respective colors.

15. The image forming method according to claim 13, further comprising:
correcting, by the processor, the position where either the image of the first color or the image of the second color is formed when a distance between a pattern of the first color and a pattern of the second color is equal to or greater than a threshold value.

16. The image forming method according to claim 14, further comprising:
correcting, by the processor, the position where either the image of the first color or the image of the second color is formed when a distance between a pattern of the first color and a pattern of the second color is equal to or greater than a threshold value.

17. The image forming method according to claim 13, further comprising:
determining a deviation between a distance where a first pattern is to be formed and a position of another pattern acquired by the sensor.

18. The image forming method according to claim 13, further comprising:
correcting, by the processor, the position where the printer forms an image in units of dots.

19. The image forming method according to claim 13, further comprising:
after acquiring the position of the pattern of each of the plurality of colors, changing a magnification in a scanning direction.

* * * * *